(12) United States Patent
Loibl

(10) Patent No.: US 6,881,175 B2
(45) Date of Patent: Apr. 19, 2005

(54) COMBINED CONTROL DEVICE FOR THE PARKING BRAKE AND PARK LOCK FUNCTION OF MOTOR VEHICLES

(75) Inventor: Josef Loibl, Bad Abbach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/313,769

(22) Filed: Dec. 6, 2002

(65) Prior Publication Data

US 2003/0087727 A1 May 8, 2003

Related U.S. Application Data

(63) Continuation of application No. PCT/DE01/02050, filed on May 30, 2001.

(30) Foreign Application Priority Data

Jun. 8, 2000 (DE) .......................................... 100 28 350

(51) Int. Cl.⁷ ........................ B60K 41/20; B60K 41/26; B60L 7/00; B60T 15/14
(52) U.S. Cl. .................... 477/182; 192/219.4; 188/158; 303/20
(58) Field of Search ................................ 188/110, 156, 188/158; 303/3, 15, 20, DIG. 2; 477/92; 192/219, 219.6, 219.7, 219.1, 219.4

(56) References Cited

U.S. PATENT DOCUMENTS

| | | | |
|---|---|---|---|
| 4,629,043 A | * | 12/1986 | Matsuo et al. ................ 477/92 |
| 4,892,014 A | | 1/1990 | Morell et al. ................. 74/866 |
| 5,696,679 A | * | 12/1997 | Marshall et al. .............. 477/92 |
| 5,759,132 A | * | 6/1998 | Osborn et al. ................ 477/96 |
| 5,827,149 A | | 10/1998 | Sponable ..................... 477/92 |
| 6,019,436 A | * | 2/2000 | Siepker ....................... 188/156 |
| 6,273,232 B1 | * | 8/2001 | Kimura et al. ........... 192/219.6 |
| 6,293,363 B1 | * | 9/2001 | Rangaswamy et al. ..... 188/158 |
| 6,321,884 B1 | * | 11/2001 | Balz ........................... 188/161 |

FOREIGN PATENT DOCUMENTS

| | | | | |
|---|---|---|---|---|
| DE | 44 01 945 C1 | 3/1995 | .......... | B60R/25/06 |
| DE | 197 39 626 A1 | 6/1998 | .......... | B62D/1/04 |
| DE | 198 11 243 A1 | 9/1998 | .......... | B60K/41/26 |
| DE | 197 35 015 A1 | 2/1999 | .......... | B60R/16/02 |
| EP | 0 972 667 A1 | 7/1999 | .......... | B60K/41/26 |
| EP | 0 987 473 A2 | 9/1999 | .......... | F16H/59/10 |

\* cited by examiner

Primary Examiner—Tisha Lewis
(74) Attorney, Agent, or Firm—Baker Botts L.L.P.

(57) ABSTRACT

The combined control unit is designed with a manual drive stage input unit (2) for the vehicle gear setting and an electronic selection signal unit (5) connected at vehicle control bus (1) also electronic gearbox control (7) connected to bus, which controls the actuators (8,9) for adjusting the gearbox in the respective desired gear stage signaled by the selection unit. An electronic hand brake unit (10) is provided with an electronic hand braking function control unit (11), also hand brake input unit (12) for deactivating-activating the hand braking function and an actuator (13) for the vehicle brake. A brake pedal sensor (14) is coupled to the control bus across an interface (15). The running control of the various components is carried out, so that with the choice of the parking setting at the drive stage input unit is established across the selection signaling unit and the control bus, activates the hand brake unit and the vehicle brake.

27 Claims, 2 Drawing Sheets

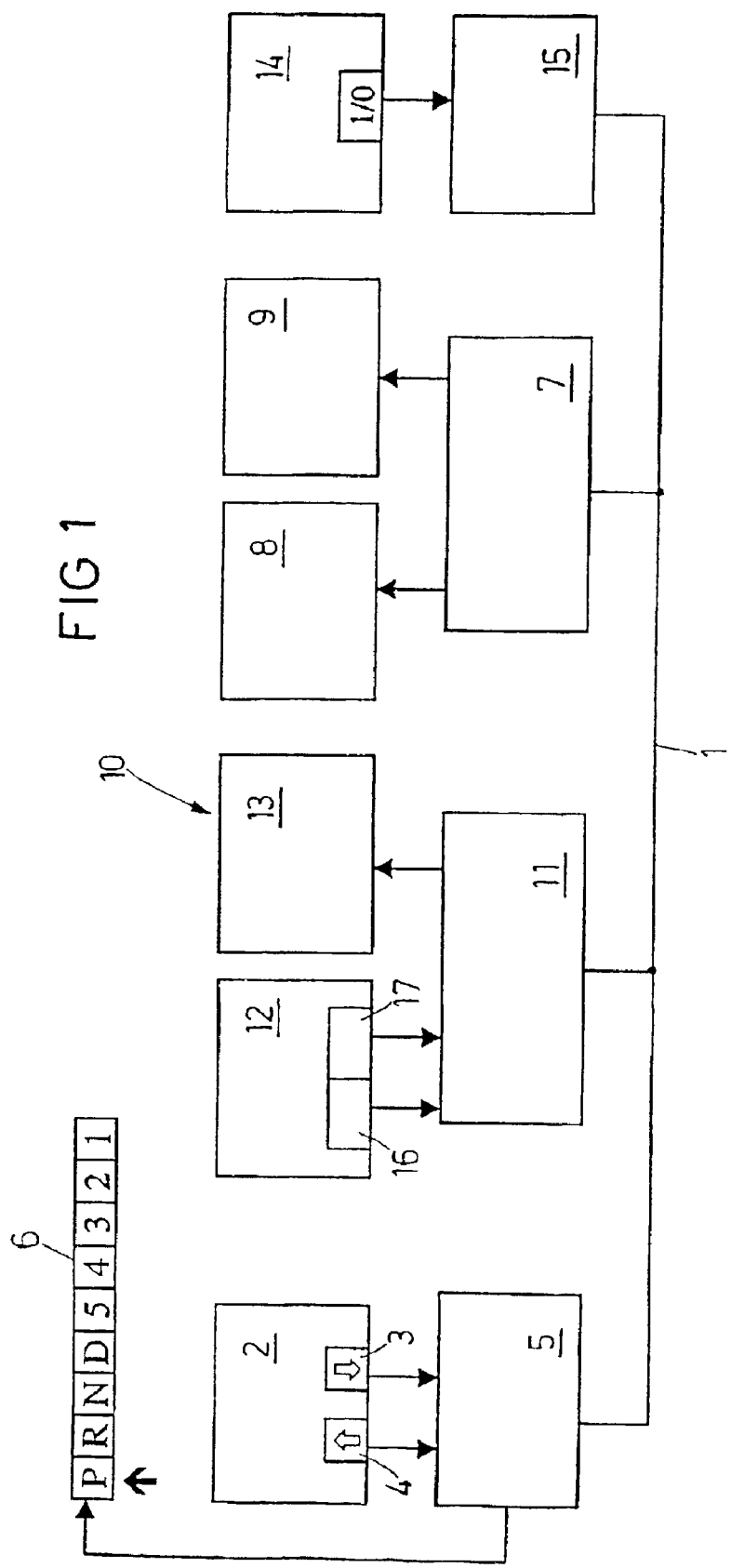

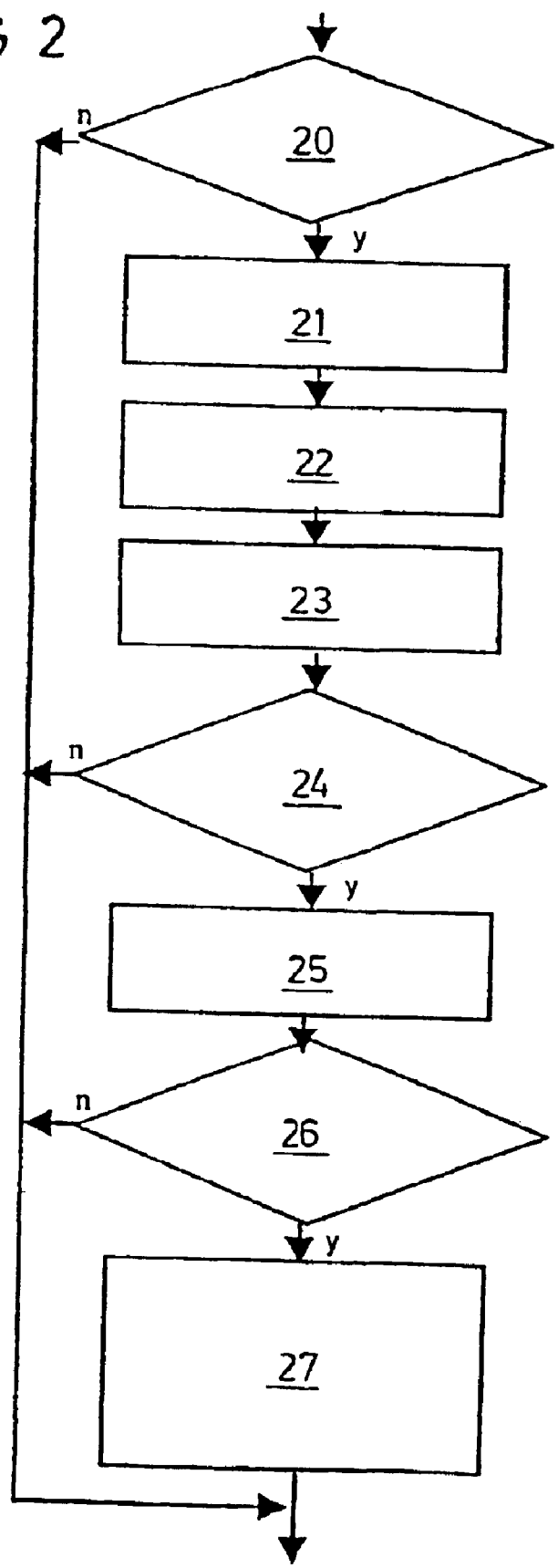

COMBINED CONTROL DEVICE FOR THE PARKING BRAKE AND PARK LOCK FUNCTION OF MOTOR VEHICLES

CROSS-REFERENCE TO RELATED APPLICATION

This application is a continuation of co-pending International Application No. PCT/DE01/02050 filed May 30, 2001, which designates the U.S., and claims priority to German application number DE10028350.0 filed Jun. 8, 2000.

BACKGROUND OF THE INVENTION

The invention relates to a combined control device for the parking brake and park lock function of motor vehicles with automatic transmission or automated manual transmission. Parking brake function is to be understood here not only as the function of the parking brake which can conventionally be activated by a separate brake pedal on the left next to the customary configuration of pedals, but also the hand brake which can be activated by means of a stick lever on the center console.

With respect to the background of the invention it is to be noted that the aforementioned automatic transmissions provide various driving positions which are abbreviated with the letters P, R, N and D (P: Park, R: Reverse, N: Neutral, D: Drive). These driving positions are selected using a selector lever in the vehicle and correspond to the actual state of the transmission. Here, in the position D in, for example, a six-gearspeed automatic transmission, the various gearspeeds in the transmission are switched hydraulically. The actuation is carried out here by means of valves which are in turn actuated by an electronic transmission controller.

In the transmission designs which are currently used in series-produced vehicles, the connection between a participating hydraulic selector slide in the transmission and the selector lever in the interior of the vehicle is implemented by means of a linkage or a Bowden cable.

In order to secure the parked vehicle in the position P (parked position), what is referred to as park lock or shift lock is provided which prevents the parked vehicle from rolling away. The function of this park lock allows a driving position R or D to be selected from the selector lever position P only if the brake pedal and the ignition key are activated. In known automatic transmissions, this park lock is integrated into the transmission and acts on what is referred to as the notched plate. In fact a detent engages in the notched plate in the position P with spring force and thus prevents the activation of the selector lever. By activating the brake pedal and the ignition key, the detent is disengaged with a Bowden cable, and the notched plate is released. After it has left the selector lever position P, the detent can no longer engage as there are no corresponding latching recesses provided in the edge of notched plate. In this position, the Bowden cable is tensioned between the detent and brake pedal and releases the second Bowden cable to the ignition lock by means of a release lever on the brake pedal. As a result, the ignition key is prevented from being withdrawn by a locking slide in the ignition lock in the driving mode. In contrast, the ignition key can be withdrawn only if the Bowden cable is tensioned between the steering lock and brake pedal and releases the ignition key via the locking slide. This tensioning of the Bowden cable is carried out with the aforementioned tensioning lever by means of the second Bowden cable as soon as the detent has latched into the notched plate.

A known alternative to mechanically configuring the park lock is implemented using an integrated transmission controller, a separate actuator, e.g. a slide valve, electrically engaging the park lock and releasing it again. In this version, the aforementioned tensioning lever and the Bowden cable assigned to it can be dispensed with but an actuator and a mechanical tensioning device are still necessary.

Modern transmission designs such as will be included in the series production of vehicles in the short to medium term provide, for reasons of cost and quality, for the transmission electronics to be integrated directly into the transmission, which is referred to as "mechatronic transmission control". The mechanical connection between the transmission and selector lever is dispensed with here. Instead, the position P, R, N or D of the selector lever in the interior of the vehicle is communicated to the transmission via electrical connections. This concept is referred to as "shift-by-wire".

SUMMARY OF THE INVENTION

The invention is then based on the object of implementing a park lock function of an automatic transmission on the basis of the mechatronic transmission control and of the shift-by-wire concept and further vehicle functions.

This object can be achieved by means of a combined control device for the parking brake and park lock function of motor vehicles with automatic transmission or automated manual transmission, comprising:

a manual driving-position input unit for the driving position of the vehicle, an electronic selection signaling unit which is connected thereto and is coupled to a vehicle control bus, an electronic transmission controller which is also connected to the vehicle control bus and drives actuators for placing the transmission in the respectively desired driving position which is signaled by the selection signaling unit, an electronic parking brake device comprising
an electronic parking brake function controller,
a manual parking brake input unit, connected thereto, for deactivating/activating the parking brake function, and
an actuator, also connected to the controller, for the vehicle brake, a brake pedal sensor, coupled to the vehicle control bus via an interface, for monitoring the activation of the brake pedal, and a sequence controller of the above components which, by means of the selection signaling unit and the control bus, activates the parking brake device and thus puts on the parking brake when the parked position is selected on the driving-position input unit.

Another embodiment is a control device for the parking brake and park lock function of motor vehicles comprising a manual driving-position input unit for the driving position of the vehicle, an electronic transmission controller which is also connected to a vehicle control bus and drives actuators for placing the transmission in the respectively desired driving position, an electronic parking brake device comprising an electronic parking brake function controller, and an actuator for the vehicle brake which is connected to the brake function controller, and a sequence controller coupled with the above components which, by means of the selection signaling unit and the control bus, activates the parking brake device when the parked position is selected on the driving-position input unit.

In this embodiment, the control device may further comprise an electronic selection signaling unit which is connected to the manual driving-position input unit and is coupled to the vehicle control bus and a manual parking brake input unit which is connected to the manual driving-position input unit for deactivating/activating the parking brake function. Furthermore, a brake pedal sensor can be provided, coupled to the vehicle control bus via an interface, for monitoring the activation of the brake pedal.

In all embodiments, when the parking brake is activated, the sequence controller can carry out electronic locking of the parked position, which can be released only be activating the brake pedal. When the parked position is activated, the sequence controller may also carry out electronic locking of the parking brake, which may be released only by deactivating the parked position. The manual driving-position input unit can be formed by a driving-position selector lever on the center console of the vehicle or a momentary-switch input unit on the steering wheel of the vehicle. The brake pedal sensor and its interface with the vehicle control bus can be part of the antilock brake system of the vehicle. When the ignition is switched off, the sequence controller can automatically activate the parked position. The sequence controller can also carry out a hill start aid function by automatically activating and deactivating the parking brake function.

A method of operating the parking brake and park lock function of motor vehicles according to the present invention comprises the steps of:

monitoring a manual driving-position input unit for the driving position of the vehicle, activating a parking brake the parked position is selected on the driving-position input unit.

The method may further comprise the step of signaling the manual driving-position and can also comprise the step of monitoring the activation of a brake pedal. When the parking brake is activated, the sequence controller may carry out electronic locking of the parked position, which may be released only be activating the brake pedal. When the parked position is activated, the sequence controller can carry out electronic locking of the parking brake, which may be released only by deactivating the parked position. The method can further comprise the step of activating the parked position when the ignition is switched off. The method can further comprise the step of carrying out a hill start aid function by automatically activating and deactivating the parking brake function.

Basically, on the basis of the sequence control above, when the driving position P (park) is selected the vehicle brake is put on and the vehicle is thus prevented from rolling away.

Further blocking mechanisms, such as unintentional release of the brake or selection of driving positions in undefined vehicle states, can be prevented by some of the other features of the inventions.

BRIEF DESCRIPTION OF THE DRAWINGS

For this purpose, in order to avoid repetitions, reference is made to the following description in which an exemplary embodiment of the invention is explained in more detail by means of the appended drawings, in which:

FIG. 1 shows a block diagram of a combined control device for the parking brake and park lock function of motor vehicles and FIG. 2 shows a flowchart of the sequence control which is implemented in the control device.

DETAILED DESCRIPTION OF THE PREFERRED EMBODIMENTS

In a shift-by-wire concept of an automated manual transmission or automatic transmission, the "backbone" is the vehicle control bus 1 which is implemented, for example, by a CAN bus. Not only the components, to be explained below, of the control device according to the invention but also other electronic controllers, for example what is referred to as the "keyless-go-system", are also connected to this control bus 1. A corresponding immobilizer function can be integrated into this system, said immobilizer function accessing the control bus 1 in precisely the same way as various diagnostic or safety-related systems.

On the one hand various components which are assigned to the actual transmission are relevant for the parking brake and park lock function, as is apparent from FIG. 1. Thus, a driving-position input unit 2 is provided which comprises, for example, momentary switches on the steering wheel of the vehicle. Firstly, the desired driving position P, R, N or D is selected by means of these momentary switches. In addition, by means of these momentary switches 3, 4 of the driving-position input unit the various gearspeeds 1–5 in a 5-gearspeed transmission are selected within the driving position D. In order to connect it to the vehicle control bus 1, the driving-position input unit 2 is coupled to an electronic selection signaling unit 5 which transfers the information relating to the selected driving position/gearspeed, encoded in accordance with the bus protocol used, to the control bus 1. In addition, the selection signaling unit 5 drives a display device 6, for example in the form of a LCD display in the dashboard of the vehicle. There, the respectively selected driving position/gearspeed is displayed, as is indicated in FIG. 1 by means of an arrow at the park position P.

The transmission complex also includes an electronic transmission controller 7 which is likewise connected to the vehicle control bus 1. Said transmission controller 7 drives actuators 8, 9 which set the selected driving position P, R, N or D and the corresponding gearspeed.

In addition, an electronic parking brake device is included in the entire control device, said parking brake device being in the present case a hand brake device 10 and an electronic hand brake function controller 11 which is connected to the vehicle control bus 1. A manual hand brake input device 12, which replaces the customary hand brake stick lever between the front seats of a vehicle, is assigned to this hand brake function controller 11. The hand brake function is activated and deactivated by the driver by means of this hand brake input device 12. The vehicle brake is put on by means of a hand brake actuator 13 which puts on the vehicle brake and releases it again by being driven by the hand brake function controller 11.

Finally a brake pedal sensor 14 is provided which monitors the activation of the brake pedal and outputs a corresponding signal. The brake pedal sensor 14 is integrated here into the control device via the ABS system 15 which is likewise connected to the vehicle control bus 1. Said ABS system 15 practically constitutes the interface between the vehicle control bus 1 and the brake pedal sensor 14.

The sequence control of the components mentioned above, which is implemented in the combined control device for the hand brake and park lock function will now be explained with reference to FIG. 2 as follows:

Step 20: There is an interrogation to determine whether the park position P has been selected on the driving-position input unit 2 by the driver; if yes ("y" in FIG. 2), the currently desired driving position P is transferred to the electronic transmission controller 7 and the hand brake function controller 11 by the selection signaling unit 5 via the vehicle control bus 1;

Step 21: The hand brake actuator 13 is then driven via the hand brake function controller 11 and the hand brake of the vehicle is continuously activated;

Step 22: A marker "locking of the hand brake" is set in the hand brake function controller 11, i.e. the hand brake is electronically locked and can no longer be released via the hand brake input unit 12 using the two momentary switches 16 ("hand brake on") and 17 ("hand brake off");

Step 23: The parked position P is electronically locked in the selection signaling unit 5 so that the selection of a driving position R, N, D which differs from the driving position P is prevented;

Step 24: There is an interrogation via the vehicle control bus 1 to determine whether the brake pedal sensor 14 has set the brake signal and the brake is therefore depressed; if this is the case ("y" in FIG. 2), the sequence controller moves on;

Step 25: The driving position P is released in the selection signaling unit 5, i.e. the driver can input a different driving position R, N or D via the driving-position input unit 2;

Step 26: There is an interrogation to determine whether a driving position which differs from P has been selected; if this is the case ("y" in FIG. 2), the sequence controller moves on;

Step 27: The electronic locking of the hand brake in the hand brake function controller 11 is reset, i.e. so that the driver can release the hand brake again by means of the hand brake input unit 12.

If the interrogation steps 20, 24 and 26 receive as a result a "no" ("n" in FIG. 2), the entire sequence routine is exited and restarted with a defined clock.

As optional functions it is also possible to implement what is referred to as an "auto-P function" and an "automatic" hill start aid function (referred to as "auto-hill-holder function") on the basis of the control device according to the invention.

In the case of the auto-P function, an interrogation routine is used to determine whether the ignition of the vehicle is switched off. If this is the case, the driving position P is automatically engaged and the hand brake is activated.

The automatic hill-holder function is implemented in automatic transmissions by virtue of the fact that, as it were, a slow forward travel is initiated on gradients to counteract backward rolling of the vehicle. This is to be implemented in automated manual shift transmissions per se only by means of a slipping activation of the clutch, which is undesired for reasons of wear. On the basis of the present control device according to the invention it is now possible to implement an automatic hill-holder function by the control device activating the parking brake function by putting on the parking brake. As a result, the vehicle is held while the parking brake can be correspondingly released when the accelerator is depressed and forward travel is started.

In summary, the combined control device according to the invention for the parking brake and park lock function of motor vehicles with automatic transmission or automated manual shift transmission has various advantages:

The components which are necessary for mechanically implementing the park lock function in the transmission, such as mechanical and hydraulic components with corresponding actuators and their drive electronics, can be dispensed with.

The control device can also be used in vehicles with automated manual transmissions, while the park lock function which is implemented in customary transmission technology only in "genuine" automatic transmissions due to the design can be simulated without appreciable additional expenditure.

Correspondingly, the modules for inputting the driving position which is desired by the driver or the desired gearspeed in the form of, for example, momentary switches on the steering wheel can be used as an equivalent of an automatic transmission and automated manual transmission.

The hand brake can be engaged by selecting the park position by means of the driving-position input unit, in particular its gearspeed momentary switches. An additional manual activation can be dispensed with.

The combined control device can also be implemented with an isolated transmission controller, that is to say one which is located for example in the engine compartment and is not integrated into the transmission.

What is claimed is:

1. A combined control device for a parking brake and park lock function of motor vehicles with automatic transmission or automated manual transmission, comprising:
   a manual driving-position input unit for the driving position of the vehicle,
   an electronic selection signaling unit which is connected thereto and is coupled to a vehicle control bus,
   an electronic transmission controller which is also connected to the vehicle control bus and drives actuators for placing the transmission in the respectively desired driving position which is signaled by the selection signaling unit,
   an electronic parking brake device comprising
      an electronic parking brake function controller,
      a manual parking brake input unit, connected thereto, for deactivating/activating the parking brake function, and
      an actuator, also connected to the controller, for the vehicle brake,
   a brake pedal sensor, coupled to the vehicle control bus via an interface, for monitoring the activation of the brake pedal, and
   a sequence controller of the above components which, by means of the selection signaling unit and the control bus, activates the parking brake device and thus puts on the parking brake when the parked position is selected on the driving-position input unit.

2. The control device as claimed in claim 1, wherein when the parking brake is activated, the sequence controller carries out electronic locking of the parked position, which can be released only be activating the brake pedal.

3. The control device as claimed in claim 1, wherein when the parked position is activated, the sequence controller carries out electronic locking of the parking brake, which can be released only by deactivating the parked position.

4. The control device as claimed in claim 1, wherein the manual driving-position input unit is formed by a driving-position selector lever on the center console of the vehicle or a momentary-Switch input unit on the steering wheel of the vehicle.

5. The control device as claimed in claim 1, wherein the brake pedal sensor and its interface with the vehicle control bus are part of the antilock brake system of the vehicle.

6. The control device as claimed in claim 1, wherein when the ignition is switched off, the sequence controller can automatically activate the parked position.

7. The control device as claimed in claim 1, wherein the sequence controller can carry out a hill start aid function by automatically activating and deactivating the parking brake function.

8. A control device for a parking brake and park lock function of motor vehicles comprising:
- a manual driving-position input unit for a driving position of the vehicle,
- an electronic selection signaling unit which is connected to the manual driving-position input unit and is coupled to a vehicle control bus;
- an electronic transmission controller which is also connected to the vehicle control bus and drives actuators for placing a transmission in the respectively desired driving position,
- an electronic parking brake device comprising
  - an electronic parking brake function controller,
  - an actuator for the vehicle brake which is connected to the brake function controller, and
- a sequence controller coupled with the above components which, by means of the selection signaling unit and the control bus, activates the parking brake device when a parked position is selected on the driving-position input unit, whereby when the parking brake is activated, the sequence controller carries out electronic locking of the parked position, which can be released only be activating the brake pedal.

9. The control device as claimed in claim 8, further comprising a manual parking brake input unit which is connected to the manual driving-position input unit for deactivating/activating the parking brake function.

10. The control device as claimed in claim 9, further comprising a brake pedal sensor, coupled to the vehicle control bus via an interface, for monitoring the activation of the brake pedal.

11. The control device as claimed in claim 10, wherein when the parked position is activated, the sequence controller carries out electronic locking of the parking brake, which can be released only by deactivating the parked position.

12. The control device as claimed in claim 8, wherein the manual driving-position input unit is formed by a driving-position selector lever on the center console of the vehicle or a momentary-switch input unit on the steering wheel of the vehicle.

13. The control device as claimed in claim 10, wherein the brake pedal sensor and its interface with the vehicle control bus are part of the antilock brake system of the vehicle.

14. The control device as claimed in claim 8, wherein when the ignition is switched off, the sequence controller can automatically activate the parked position.

15. The control device as claimed in claim 8, wherein the sequence controller can carry out a hill start aid function by automatically activating and deactivating the parking brake function.

16. A method of operating a parking brake and park lock function of motor vehicles comprising the steps of:
- monitoring a manual driving-position input unit for the driving position of the vehicle,
- activating a parking brake when the parked position is selected on the driving-position input unit; and
- determining whether a brake pedal is activated to permit selection of a different driving position via the driving-position input unit, wherein when the parking brake is activated, a sequence controller carries out electronic locking of the parked position, which can be released only by activating the brake pedal.

17. The method as claimed in claim 16, further comprising the step of signaling the manual driving-position.

18. The method as claimed in claim 16, further comprising the step of monitoring the activation of a brake pedal.

19. The method as claimed in claim 16, wherein when the parked position is activated, the sequence controller carries out electronic locking of the parking brake, which can be released only by deactivating the parked position.

20. The method as claimed in claim 16, further comprising the step of activating the parked position when the ignition is switched off.

21. The method as claimed in claim 16, further comprising the step of carrying out a hill start aid function by automatically activating and deactivating the parking brake function.

22. A method of operating a parking brake and park lock function of a motor vehicle comprising:
- monitoring a manual driving-position input unit for the driving position of the vehicle,
- activating a parking brake when the parked position is selected on the driving-position input unit; and
- determining whether a brake pedal is activated to permit selection of a different driving position via the driving position input unit, wherein when the parked position is activated, a sequence controller carries out electronic locking of the parking brake which can be released only by deactivating the parked position.

23. The method as claimed in claim 22, further comprising the step of signaling the manual driving-position.

24. The method as claimed in claim 22, further comprising the step of monitoring the activation of a brake pedal.

25. The method as claimed in claim 24, wherein the parking brake is activated, the sequence controller carries out electronic locking of the parked position, which can be released only by activating the brake pedal.

26. The method as claimed in claim 22, further comprising the step of activating the parked position when the ignition is switched off.

27. The method as claimed in claim 22, further comprising the step of carrying out a hill start aid function by automatically activating and deactivating the parking brake function.

* * * * *